United States Patent [19]

Wind

[11] Patent Number: 4,596,843
[45] Date of Patent: Jun. 24, 1986

[54] HIGH SOLIDS COATING COMPOSITIONS

[75] Inventor: Donald G. Wind, Niles, Ill.

[73] Assignee: Insilco Corporation, Meriden, Conn.

[21] Appl. No.: 714,092

[22] Filed: Mar. 20, 1985

[51] Int. Cl.$^4$ .............................................. C08L 63/00
[52] U.S. Cl. ................... 523/416; 523/402;
523/404; 523/418; 523/424; 523/429; 523/438;
523/439; 523/454; 523/455; 523/456; 523/462;
523/463; 523/464; 524/317; 524/361; 524/364;
524/365; 524/512; 524/539; 524/542; 525/510;
525/511
[58] Field of Search ............... 525/510, 511; 523/454,
523/456, 462, 464, 416, 404, 418, 400, 402, 455,
424, 429, 438, 439; 524/317, 361, 364, 365, 512,
539, 542

[56] References Cited

U.S. PATENT DOCUMENTS

| | | | |
|---|---|---|---|
| 3,399,162 | 8/1968 | Salame | 523/462 |
| 4,018,848 | 4/1977 | Khanna | 525/510 X |
| 4,118,437 | 10/1978 | Parekh | 525/510 |
| 4,169,825 | 10/1979 | Yapp et al. | 523/456 |
| 4,342,674 | 8/1982 | Morgan | 523/177 |

*Primary Examiner*—Theodore E. Pertilla
*Attorney, Agent, or Firm*—Emrich & Dithmar

[57] ABSTRACT

A high solids coating composition which comprises 10–96 percent by weight resin solids of a low molecular weight epoxy oligomer, 2–35 percent by weight crosslinking glycoluril-formaldehyde resin and a primary sulfonic acid catalyst. The oligomer is condensed upon heating into a high molecular weight polymer film with simultaneous crosslinking with the crosslinking agent to provide the desired film properties.

24 Claims, No Drawings

HIGH SOLIDS COATING COMPOSITIONS

BACKGROUND OF THE INVENTION

The object of the present invention relates to high solids technology and a novel and unique overprint coating varnish and enamel composition.

In the past, high solids epoxy resin compositions have been suggested to provide protective coatings on metal surfaces. Generally, the compositions contain an epoxy resin, an alkylated melamine-formaldehyde crosslinking resin, an acid catalyst, a polyol and an organic solvent, which compositions are applied to clean metal surfaces to form protective coatings thereon. See for example, U.S. Pat. Nos. 4,018,848 and 4,342,674 for a discussion of such high solids coating compositions. Although such coatings result in a high molecular weight epoxy coatings which exhibit fast cure, such coatings do not satisfy environmental requirements in that when more than 0.5 weight percent of a catalyst is utilized, the crosslinking resin goes through the formaldehyde spitting step to form the cured aminoplast resin coating which releases, and formaldehyde as a by-product, which is an undesirable and toxic chemical. Also, the use of acid catalysts generally result in discoloration of the protective coatings and recent literature (October, 1980 Modern Paint and Coatings) has suggested that triflic acid catalysts darken epoxy coatings and char the coatings, when the coatings are overbaked. Therefore, such coatings compositions are impractical and their reactions are uncontrollable. Also, such compositions do not possess adequate moisture resistance to steam, an important requirement of today's food processing industry. Accordingly, such compositions have found only limited applications as overprint varnishes and enamels in treating cans and crowns for protection from rusting and deterioration of the canned product.

SUMMARY OF THE INVENTION

According to the present invention there is provided a high solids coating composition applicable to overprint varnishes and enamels coatings to food and beverage cans which exemplifies a breakthrough in high solids technology by permitting coatings to be prepared that have exceptional flexibility and coatings to be prepared which withstand subsequent steam processing with exceptional steam resistance. The present invention is a process whereby low molecular weight oligomers are condensed upon heating into a high molecular weight polymer with simultaneous crosslinking with a crosslinking agent. Indeed, the present invention represents a synergistic effect when the combination of two specific catalysts and specific crosslinking agent are utilized.

In accordance with the present invention, there is provided high solids overprint varnish and enamel compositions which comprises between about 10 to 96 percent by weight epoxy resin component, between about 2 to 35 percent by weight crosslinking resin, a glycoluril-formaldehyde resin, between about 0.05-0.5 percent by weight primary catalyst comprised of trifluoromethanesulfonic acid and between about 2 to 40 percent by weight solvent. The resultant high solids composition is applied to a metal substrate and produces in place a film of a low molecular weight oligomer which is cured to a high molecular weight film on the metal surface.

DETAILED DESCRIPTION OF THE INVENTION

The high solids coating composition, which provides an overprint varnish or enamel film on a metal surface is comprised of essentially a three-component coating composition having a polyfunctional epoxy resin component comprised of between about 10 to 96 percent by weight resin solids, a crosslinking resin component comprised of between about 2 to 35 percent by weight resin solids, a primary catalyst component comprised of between about 0.05 and 0.5 percent by weight catalyst and between about 2 to 40 percent by weight solvent. The novel high solids composition in accordance with the present invention, having an overall solid composition of between about 60 to 98 percent by weight of the total composition may be applied, for example, to cans or crowns or any substrate which is capable of withstanding cure cycles of between about 4–30 minutes at 250°–450° F. and between about 15–60 seconds at 450°–750° F. Such compositions may contain up to 4 to 5 percent by weight water to produce a film in place having a low molecular weight which is cured into a high molecular weight film on the metal without diminishing the desired and novel cured film properties of the present invention. Indeed, with proper selection of the polyol and the aminoplast, with or without the presence of water miscible solvents, a coating composition may include water as the solvent for viscosity reduction for application to a chosen substrate.

The epoxy resin component is, preferably, a bisphenol A epichlorohydrin epoxy resin having an average weight per epoxide of about 1100 or less. It is preferred that the average weight per epoxide be about 400 or less to provide the high solid composition coatings, and when higher weight epoxides are used, the resultant coatings have a solids composition content towards the low end of the desired range. Additionally, a cycloaliphatic epoxy resin, novolacs, and other miscellaneous polyfunctional glycidyl epoxies may be utilized as the epoxy resin component of the present high solids coating composition depending upon the desired chemical resistance, hardness and flexibility of the cured film.

The crosslinking resin component of the present composition is a glycoluril-formaldehyde resin, one of is sold under the trade name Cymel 1170 (American Cyanamide Company). The importance of utilizing a crosslinking resin of the glycoluril-formaldehyde component, is that this material does not go through the formaldehyde splitting step common to the ureas, melamines, benzoquanamine to produce an aminoplast. This is undesireable when producing cured films because the release of formaldehyde and subsequent formation ofthe amine poisons the catalytic effect thereby preventing formation high molecular weight films. However, it is within the scope of this invention that any aminoplast that does not release formaldehyde thereby generating amines which poison the high molecular weight film may be utilized in the present invention. At the present time, only the glycoluril-formaldehyde resins as the crosslinking resins are commercially available.

The primary catalyst is, preferably, trifluoromethanesulfonic acid which is known as triflic acid and available commercially as FC24 (3M Company) or the slats of this sulfonic acid. However, other Lewis acid catalysts that promote the same degree of polymerization of the oligomers into the high molecular weight polymer could be used as the catalyst.

The present invention provides a coatings composition which is essentially a process whereby a low molecular weight oligomers are condensed into a high molecular weight polymer upon heating with a simultaneous crosslinking with a crosslinking agent in the presence of the primary catalyst. However, a secondary acid catalyst of between 0 and 1.0 percent by weight may be utilized and the secondary acid catalyst may be comprised of phosphoric acid and phosphate esters, methane sulfonic acid, p-toluene sulfonic acid, polycat 200 dodecyl benzene sulfonic acid, dinonyl napthalene sulfonic acid and disulfonic acid.

The use of a secondary acid catalyst is preferred in practicing the present invention because adequate amounts of the primary catalyst to promote the crosslinking of the glycoluril-formaldehyde crosslinking resin cause degredation of the film properties, such as, color and water resistance. Accordingly, lower levels of the primary catalyst are used in the present invention in quantities and amounts sufficient to only promote the epoxy-ring opening polymerization and the secondary catalyst is used in sufficient quantities and amounts to catalyze the glycoluril-formaldehyde condensation with the product of the epoxy-ring opening polymerization. The amounts of both the primary and secondary catalyst used in the present invention is dependent upon the time-temperature relationship of the curing cycle desired.

Additionally, the high solids coating composition may contain resin modifiers of between 0 to 65 percent by weight of the total composition. The modifiers may be polyols derived from polyepoxides, alkyds, polyesters, acrylics, vinyls, phenolics, polyvinyl pyrolidone and derivatives, polyether glycols and derivatives, polycaprolactone polyols, cellulose and derivatives, epoxy esters, polyvinyl butyrol, styrene allyl alcohol copolymers and derivatives, styrene maleic anhydride copolymers and derivatives, epoxy dimer fatty acid adducts and miscellaneous anhydrides. These materials provide desired properties of the finished film, such as, changing the hardness, the flexibility of the film improving the drying, mar resistance and flowing characteristics, as well as substituting cheaper adducts for the epoxy resin component.

Also, miscellaneous additives such as pigments, waxes, flow control and wetting agents, such as, silicones and other acrylic wetting agents and amines as stabilizers for the catalyst may be used to improve the desired film properties, such as, mar resistance and disposition of the finished film, as desired.

The process whereby low molecular weight oligomers are condensed into a high molecular weight polymer upon heating in the presence of a catalyst, with the simultaneous crosslinking with a crosslinking agent is conducted in the presence of between about 2 to 40 percent by weight solvents, which may contain minor amounts of water. The solvents which may be used include aliphatic petroleum distillates, aromatic petroleum distillates, esters, glycolethers, alcohols, ketones, chlorinated hydrocarbons, ethers, terpene hydrocarbons and nitro paraffins. However, as pointed out herebefore, with proper selection of the polyol and the aminoplast, with or without the presence of water miscible solvents, a coating composition may include water as the solvent for viscosity reduction for application to a chosen substrate.

The invention is illustrated by the following examples:

EXAMPLE 1

To a container was added 106.7 grams of bisphenol A epichlorohydrin epoxy resin, available as EPON 834×90 (Shell Oil Company), 4 grams of glycoluril-formaldehyde resin, available as CYMEL 1170 (American Cynamide Co.), 0.3 grams of trifluoromethanesulfonic acid, available as FC 24 (3M Company), and 0.4 grams of fluorocarbons surfactant, available as FC 430 (3M Company) in the presence of 12.6 grams of ethylene glycol ethylether acetate and 6 grams of methyl amyl ketone solvent. The percent resin solids of the epoxy resin was 96 and the per cent resin solids of the crosslinking resins was 4 percent and the total solids composition of the coating composition was 77.0 percent. The resulting high molecular weight polymer condensed upon heating and upon depositing the resultant solution unto a metal substrate produced a rapid cured high molecular weight film on the metal substrate upon heating to 400° F. for 8 minutes. The deposited and cured film exhibited excellent adhesion to the metal, excellent chemical resistance and excellent resistance to boiling water and retorting where steam under pressure was directed to the film for one and one-half half hours at 265° F. Also, the cured film remained clear without discoloration after four overbaking operations, that is, repeating the original cure schedule four times.

EXAMPLE 2

In a container was added a mixture of epoxy resins consisting of 10 grams of cellulose acetate buturate, available as CAB 551-0-01 (Eastman Chemical Co.) dissolved in 30 grams of ethylene glycol ethyl ether acetate solvent, 38.9 grams of bisphenol A epichlorohydrin epoxy resin, available as EPON 834×90 (Shell Oil Co.) and 45 grams of polyether polyol, available as PeP550 (BASF Chemical Co.). To this mixture was added 10 grams of glycoluril-formaldehyde resin, identified as CYMEL 1170 (American Cyanide Co.), and 0.25 grams of trifluoromethanesulfonic acid, available as FC 24 (3M Company) and 0.5 grams of silicone fluid, available as L-7500 (Union Carbide Co.) and 8.35 grams of ethylene glycol ether acetate solvent. The epoxy resin component had a percent resin solid of 35, 10 per cent was CAB and 45 percent polyol with the glycolurilformaldehyde resin having a percent resin solids of 10. The total percent solids of the composition was 70.5 percent by weight. The resulting high molecular weight polymer condensed upon heating and upon depositing the resultant solution unto a metal substrate produced a rapid cured high molecular weight film on the metal substrate upon heating to 400° F. for 8 minutes. The deposited and cured film exhibited excellent adhesion to the metal, excellent chemical resistance and excellent resistance to boiling water and retorting where steam under pressure was directed to the film for one and one-half half hours at 265° F. Also, the cured film remained clear without discoloration after four overbaking operations.

EXAMPLE 3

In a container was placed the epoxy resin component which consisted of a 35.6 grams of bisphenol A epichlorohydrin epoxy, available as EPON 834x90 (Shell Oil Co.) a 90 percent solution in xylene, with the epoxy having a weight per epoxide of between 230–280, 10 grams of a polyether polyol, available as PeP 550 (BASF Corp.) and 50 grams of the polyester of dimer fatty acids, neopenthyl glycol, phthalic anhydride and pentaerythritol an 80 percent solution in proprolene glycol methyl ether acetate, with the crosslinking resin being 18 grams of glycolurilformaldehyde resin, available as CYMEL 1170 (American Cynamide Co.). The primary catalyst was 0.1 grams of trifluoromethanesulfonic acid, available as FC 24 (3M Company) with a secondary acid catalyst of 0.2 grams of cyclohexyl sulfamic acid, available as POLYCAT 200 (Abbott Laboratories) with miscellaneous additives of silicone fluid, available as L-7500 (Union Carbide Corp.) and an acrylic resin modifier, and diisopropylamine stabilizer. The solvents were 15.82 grams of xylene, 5 grams of propylene glycol methyl ether acetate, 2.44 grams of propylene glycol methyl ether and 5 grams of methyl amyl ketone. The overall solid content of the resin fomulation was 18 percent crosslinking resin, 32 percent bisphenol A epichlorohydrin, 10 percent polyether polyol and 40 percent polyester of dimer fatty acids, with the total percent solids of the composition being 70.6 percent. It was observed that it was not possible to utilize the primary catalyst in a sufficient amount without lowering the water or steam resistance of the final baked film. The use of a secondary acid catalyst is preferred in practicing the present invention because adequate amounts of the primary catalyst to promote the crosslinking of the glycolurilformaldehyde crosslinking resin cause degradation of the film properties, such as, color and water resistance. Accordingly, lower levels of the primary catalyst are used in the present invention in quantities and amounts sufficient to only promote the epoxy-ring opening polymerization and the secondary catalyst is used in sufficient quantities and amounts to catalyze the glycoluril-formaldehyde condensation with the product of the epoxy-ring opening polymerization. The amounts of both the primary and secondary catalyst used in the present invention is dependent upon the time-temperature relationship of the curing cycle desired. Accordingly, a secondary acid catalyst was utilized with the primary acid catalyst to provide a film which was deposited upon a metal substrate and cured at 400° F. for 8 minutes. The deposited and cured film exhibited excellent adhesion to the metal, excellent chemical resistance and excellent resistance to boiling water and retorting where steam under pressure was directed to the film for one and one-half half hours at 265° F. Also, the cured film remained clear without discoloration after four overbaking operations.

EXAMPLE 4

In a container was placed 22.2 grams of the epoxy resin component consisting of bisphenol A epichlorohydrin epoxy resin, available as EPON 834×90 (Shell Oil Company) a 90 percent solution in xylene, 65 grams of a polyester, available as 3305 (Enterprise Paint Co.) an 80 percent solution in proprolene glycol methyl ether acetate and 28 grams of the crosslinking resin of glycoluril-formaldehyde resin, available as CYMEL 1170 (American Cynamide Co.). The total resins solids included 20 percent epoxy resin component, 28 percent crosslinking resin and 52 percent weight polyester, with the primary acid catalyst being 0.15 grams of trifluoromethanesulfonic acid, available as FC 24 (3M Company,) 0.85 grams of a secondary acid catalyst, identified as cyclohexcyl sulfamic acid, available as POLYCAT 200 (Abbott Laboratories) and 0.2 grams of a silicone fluid, available as L-7500 (Union Carbide Corp.) with miscellaneous additives, such as, 0.35 grams of a wetting agent and 3.5 grams of an 18 percent solution of wax in isopropyl alcohol. The organic solvent utilized were 10.25 grams of xylene, 5 grams of methyl amyl ketone, 0.6 grams of diisopropyl amine and 8.9 grams of DOWANOL PM (Dow Chemical Co.). The total weight solids of the composition was 70.5 percent. The resulting high molecular weight polymer condensed upon heating and upon depositing the resultant solution unto a metal substrate produced a rapid cured high molecular weight film on the metal substrate upon heating to 340° F. for 8 minutes. The deposited and cured film exhibited excellent adhesion to the metal, excellent chemical resistance and excellent resistance to boiling water and retorting where steam under pressure was directed to the film for one and one-half half hours at 265° F. Also, the cured film remained clear without discoloration after four overbaking operations.

EXAMPLE 5

In a container was added a mixture of epoxy resins consisting of 30 grams of bisphenol A epichlorohydrin epoxy resin, available as EPON 826 (Shell Oil Co.) having a weight per epoxide of 190 and 50 grams of polyether polyol, available as XD-8021.01 (Dow Chemical Co.). To this mixture was added 20 grams of water soluble glycoluril-formaldehyde resin, identified as CYMEL 1171 (American Cyanide Co.), and 0.3 grams of trifluoromethanesulfonic acid, available as FC 24 (3M Company) and 0.5 grams of silicone fluid, available as L-7500 (Union Carbide Co.) and 10 grams of ethylene glycol ethyl ether acetate and 20 grams water solvent. The epoxy resin component had a percent resin solid of 30, 50 percent polyol and glycolurilformaldehyde resin having a percent resin solids of 20. The total percent solids of the composition was 70 percent by weight. It has been observed that the high molecular weight polymers upon heating to cure cycles of 250°-450° F. and up to 450°-750° F. produced films which maintain their exceptional moisture resistance to steam, possess superior adhesion and chemical resistance and remain clear after several overbaked conditions.

It has been found also that compositions containing the crosslinking resin, the epoxy resin component and the primary catalyst component may be roll coated, either direct or reverse, flow coated, dip coated or sprayed by manual airless or electro-static spray guns unto various types of substrates, such as metal, wood, plastic (having a high temperature resistance) and fabrics, such as nylon.

Additionally, it has been observed that when the primary catalyst or trifluoromethanesulfonic acid is utilized in an amount greater than about 0.5 percent by weight, the obtained films are discolored, which is believed to be a result of the exotherm of the condensation with generally a loss or reduction in steam resistance. Thus, the usage of the primary catalyst in the range of between about 0.1 and 0.5 percent by weight results in the crosslinking resin avoiding the formation of the formaldehyde splitting step to the aminoplast to produce in place a condensed high molecular weight polymer exhibiting superior resistance to moisture (steam), superior adhesion to the selected substrates and superior chemical resistance to attack by chemicals.

The particular quantities of the resin modifiers and miscellaneous additives that may be added to the process may be adapted to suit the particular cured film that is deposited on the particular substrate as desired.

Although the high solids coating compositions in accordance with the present invention contains between about 60–98 percent solids, the preferred range of the percentage of solids is between about 65–80. Additionally, it is preferred that the high solids coating composition in accordance with the present invention consist of between about 190–200 to 400 average weight per epoxide of the 1,2 epoxy resin and, it is preferred, that the high solids coating composition contain a solvent which is substantially non-aqueous and that the coating composition contain less than about 4–5% by weight water, with the preferred range of weight percent of the solvent in the composition being between 20–35.

What has been described is a novel and unique process for obtaining a high solids overprint compositions which can be prepared having exceptional flexibility and resistance to subsequent steam processes which have heretofore been unknown in the art.

I claim:

1. A high solids coating composition having between about 60–98 percent solids, consisting essentially of between about 10–96 percent of 1,2 epoxy resin having an average weight per epoxide of about 1100 or less, between 2–35 weight percent of glycoluril-formaldehyde crosslinking agent, between 0.05–0.5 weight percent of a primary catalyst selected from the group consisting of trifluoromethanesulfonic acid and salts thereof and between 2–40 weight percent of a solvent selected from the group consisting of aliphatic petroleum distillates, aromatic petroleum distillates, esters, ethers, glycol ethers, alcohols, ketones, chlorinated hydrocarbons, terpene hydrocarbons and nitro paraffins.

2. The coating composition in accordance with claim 1 further including between 0–1.0 weight percent of a secondary acid catalyst selected from the group consisting of phosphoric acid and phosphate esters, methane sulfonic acid, p-toluene sulfonic acid, dodecyl benzene sulfonic acid, dinonyl napthalene sulfonic acid and disulfonic acid.

3. The coating composition in accordance with claim 1 further including between 0–65 weight percent resin polyol modifiers selected from the group consisting of polyesters, acrylics, vinyls, phenolics, polyvinyl pyrolidone and derivatives polyether glycols and derivatives, polycaprolactone polyols, cellulose and derivatives, epoxy esters, polyvinyl butyrol, styrene allyl alcohol copolymers and derivatives, styrene maleic anhydride copolymers and derivatives, epoxy dimer fatty acid adducts and anhydrides.

4. The coating composition in accordance with claim 1 wherein said 1,2 epoxy resin has a preferred average weight per epoxide of between about 200–400.

5. The coating composition in accordance with claim 1 wherein the preferred range of the pecentage of solids is between about 65–80.

6. The coating composition in accordance with claim 1 wherein said solvent is substantially non-aqueous and wherein the coating composition contains less than about 4–5 percent by weight water.

7. The coating composition in accordance with claim 1 wherein the preferred range of weight percent of the solvent is between 20–35.

8. The coating composition in accordance with claim 1 further including additives selected from the group consisting of pigments, waxes, wetting agents and stabilizers.

9. A high solids coating composition having between about 60–98 percent solids, consisting essentially of between 10–96 weight percent or 1,2 epoxy resin having an average weight per epoxide of about 1100 or less, between 2–35 weight percent of glycoluril-formaldehyde crosslinking agent, between 0.05–0.5 weight percent of a primary catalyst selected from the group consisting of trifluoromethanesulfonic acid and salts thereof and between 2–40 weight percent of a solvent selected from the group consisting of aliphatic petroleum distillates, aromatic petroleum distillates, esters, ethers, glycol ethers, alcohols, ketones, chlorinated hydrocarbons, terpene hydrocarbons and nitro paraffins, between 0–1.0 weight per cent of a secondary acid catalyst selected from the group consisting of phosphoric acid and phosphate esters, methane sulfonic acid, p-toluene sulfonic acid, cyclohexyl sulfamic acid, dodecyl benzene sulfonic acid and di nonyl napthalene sulfonic acid and disulfonic acid, and between 0–65 weight percent resin polyol modifiers selected from the group consisting of polyesters, acrylics, vinyls, phenolics polyvinyl pyrolidone and derivatives polyether glycols and derivatives, polycaprolactone polyols, cellulose and derivatives, epoxy esters, polyvinyl butyrol, styrene allyl alcohol copolymers and derivatives, styrene maleic anhydride copolymers and derivatives, epoxy dimer fatty acid adducts and anhydrides.

10. The coating composition in accordance with claim 9 wherein said 1,2 epoxy resin as a preferred average weight per epoxide of between about 200–400.

11. The coating composition in accordance with claim 9 wherein the preferred range of the percentage of solids is between about 65–80.

12. The coating composition in accordance with claim 9 wherein said solvent is non-aqueous and the coating composition is essentially free of water.

13. The coating composition in accordance with claim 9 wherein the preferred range of weight percent of the solvent is between 20–35.

14. The coating composition in accordance with claim 9 further including additives selected from the group consisting of pigments, waxes, wetting agents and stabilizers.

15. A high solids coating composition having between about 60–98 percent solids, consisting essentially of between about 10–96 weight percent of 1,2 epoxy resin having an average weight per epoxide of about 1100 or less, between 2–35 weight percent of glycoluril-formaldehyde crosslinking agent, between 0.05–0.5 weight percent of a primary catalyst selected from the group consisting of trifluoromethanesulfonic acid and salts thereof and between 2–40 weight percent of a solvent selected from the group consisting of water, aliphatic petroleum distillates, aromatic petroleum distillates, esters, ethers, glycol ethers, alcohols, ketones, chlorinated hydrocarbons, terpene hydrocarbons and nitro paraffins.

16. The coating composition in accordance with claim 15 further including between 0–1.0 weight percent of a secondary acid catalyst selected from the group consisting of phosphoric acid and phosphate esters, methane sulfonic acid, cyclohexyl sulfamic acid, p-toluene sulfonic acid, dodecyl benzene sulfonic acid, dinonyl napthalene sulfonic acid and disulfonic acid.

17. The coating composition in accordance with claim 15 further including between 0–65 weight percent resin polyol modifiers selected from the group consisting of polyesters, acrylics, vinyls, phenolics, polyvinyl pyrolidone and derivatives polyether glycols and derivatives, polycaprolactone polyols, cellulose and derivatives, epoxy esters, polyvinyl butyrol, styrene allyl alcohol copolymers and derivatives, styrene maleic anhydride copolymers and derivatives, epoxy dimer fatty acid adducts and anhydrides.

18. The coating composition in accordance with claim 15 wherein said 1,2 epoxy resin has a preferred average weight per epoxide of between about 190–400.

19. The coating composition in accordance with claim 15 wherein the preferred range of the percentage of solids is between about 65–80.

20. The coating composition in accordance with claim 15 wherein the preferred range of weight percent of the solvent is between 20–35.

21. The coating composition in accordance with claim 15 further including additives selected from the group consisting of pigments, waxes, wetting agents and stabilizers.

22. The coating composition of claim 3 wherein said modifiers are alkyds.

23. The coating composition of claim 9 wherein said modifiers are alkyds.

24. The coating compositions of claim 17, wherein said modifiers are alkyds.

* * * * *